United States Patent [19]

Nagaoka

[11] 4,366,608
[45] Jan. 4, 1983

[54] METHOD FOR MANUFACTURING FLUID CONTACTING DEVICE

[75] Inventor: Tadayoshi Nagaoka, Matsubara, Japan

[73] Assignees: Nagaoka Kanaami Kabushiki Kaisha, Matsubara, Japan; Rolf P. C. Manteufel, Kalmthout-Heide, Belgium

[21] Appl. No.: 154,426

[22] Filed: May 29, 1980

[30] Foreign Application Priority Data

Jun. 1, 1979 [JP] Japan .................................. 54-68536

[51] Int. Cl.³ ............................................ B23P 15/00
[52] U.S. Cl. ......................... 29/157 R; 261/DIG. 72; 261/94; 428/116; 52/606; 228/181; 138/37; 138/DIG. 11
[58] Field of Search ...................... 29/157 R, 163.5 R; 261/DIG. 72, 94, 95, 98; 210/150; 428/73, 116; 52/808, 606; 228/181, 173 C, 173 F; 138/37, 42, 156, 170, 171, DIG. 11

[56] References Cited

U.S. PATENT DOCUMENTS

| | | | |
|---|---|---|---|
| 899,898 | 9/1908 | Petersen | 261/DIG. 72 |
| 912,310 | 2/1909 | Guttmann | 261/94 |
| 1,307,635 | 6/1919 | Nielsen | 138/37 |
| 1,604,300 | 10/1926 | Opitz | 29/157.3 R |
| 1,896,286 | 2/1933 | Burns et al. | 29/163.5 R |
| 1,899,080 | 2/1933 | Dalgliesh | 29/163.5 R |
| 2,047,444 | 7/1936 | Stedman | 261/94 |
| 2,405,594 | 8/1946 | Melvill | 261/94 |
| 2,663,321 | 12/1953 | Jantsch | 138/DIG. 11 |
| 3,200,489 | 8/1965 | Keeleric | 228/181 |
| 3,489,208 | 1/1970 | Manteufel | 261/94 |
| 3,639,106 | 2/1972 | Yate | 228/181 |
| 3,724,825 | 4/1973 | Streck | 261/DIG. 72 |
| 3,914,486 | 10/1975 | Borgford | 428/73 |
| 3,952,077 | 4/1976 | Wigley | 261/DIG. 72 |
| 4,020,205 | 4/1977 | Haselbauer | 428/116 |

FOREIGN PATENT DOCUMENTS

401112 11/1933 United Kingdom .......... 29/157.3 R

*Primary Examiner*—Daniel C. Crane
*Attorney, Agent, or Firm*—Diller, Ramik & Wight

[57] ABSTRACT

According to the invention, there is provided a method for manufacturing a fluid contacting device according to which a single side wall of vertically continuous hollow prism-shaped elements is formed of a single sheet of metal or like material and a plurality of such sheets are regularly arranged and joined together to form the fluid contacting device. By this arrangement, assembling of the fluid contacting device is made very simple, waste of material in forming the side wall sheet can be held to the minimum and an unused portion between a column and the fluid contacting device can be eliminated whereby a fluid contacting efficiency can be improved.

16 Claims, 12 Drawing Figures

METHOD FOR MANUFACTURING FLUID CONTACTING DEVICE

DETAILED DESCRIPTION OF THE INVENTION

This invention relates to a method for manufacturing a fluid contacting device.

A packed column employed for various plants, together with a shelved column, constitutes typical device for causing gas and liquid currents to contact each other and is employed for various apparatuses including refining and distilling, liquid extraction, and gas absorption apparatus.

BRIEF DESCRIPTION OF THE DRAWINGS

In the accompanying drawings.

Figure 1:
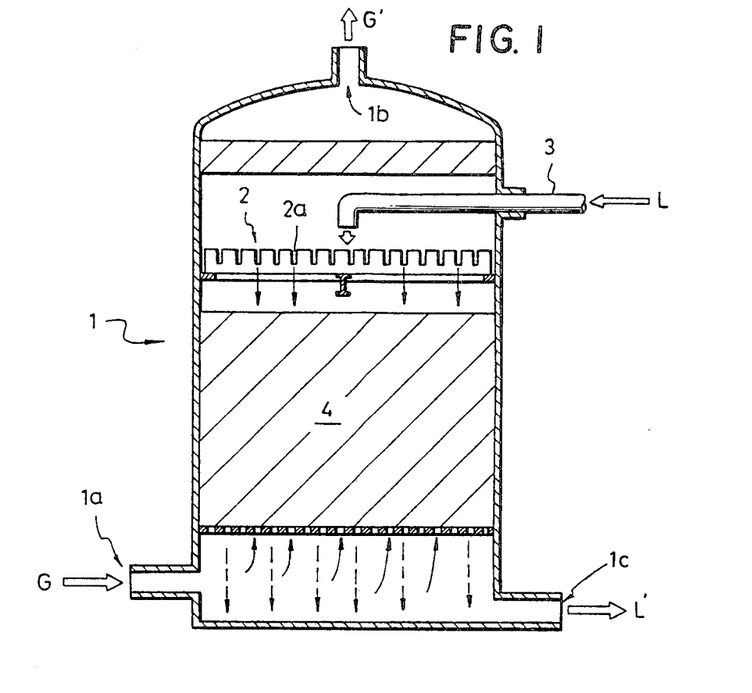
FIG. 1 is a view for explaining a packed column.

Referring to FIG. 1, this packed column 1 has a trough-like liquid distributor 2 provided in the upper portion of the column 1. Liquid L is supplied to the distributor 2 through a pipe 3 and dripped from numerous slits 2a formed on both sides of the distributor 2. In the meanwhile, selected gas G is supplied to the lower portion of the column 1 from an opening 1a. The liquid dripping from the distributor 2 and the ascending gas come into contact and react with each other on the surface of multitudes of packing elements 4 packed in the central portion of the column. Reacted gas G' is taken out of an opening 1b formed on the top of the column 1 while reacted liquid L' is taken out of an opening 1C formed in the lower portion of the column 1.

In such a packed column, it is necessary to distribute the liquid flowing over the packing elements 4 uniformly so that the liquid will contact the ascending gas most efficiently.

Conventional packed column, however, is so constructed that a great number of packing elements are randomly filled in the column with a result that a uniform flow of the liquid can not be expected so that a part of packing elements is wasted unused and, besides, there are formed separate channels for liquid and gas and hence reaction between the liquid and gas is not performed efficiently.

Figure 2:
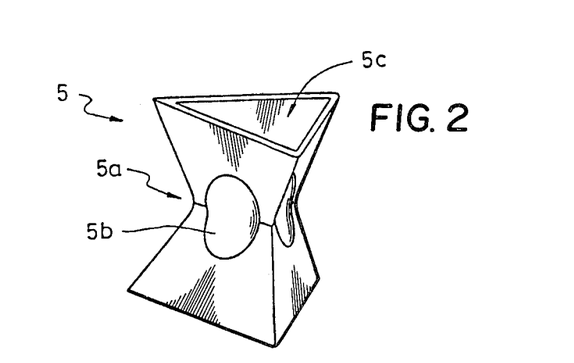
FIG. 2 is a view showing an example of a packing element.

For eliminating the above described disadvantages of the conventional packed column, employment of hollow prism-shaped packing elements 5 has recently been proposed. This hollow prism-shaped element 5 is substantially of a triangular configuration in its plan view, with its central portion 5a being narrowly constricted and has an opening 5c formed in the axial direction (i.e. the direction of flow) of the packing. Further, an inwardly bulging portion 5b is formed in the central portion 5a for increasing the surface area and further decreasing the constricted cross section inside the prism-shaped packing element 5. Such hollow prism-shaped element 5 is formed of a suitable material, e.g. porcelain.

Figure 3:
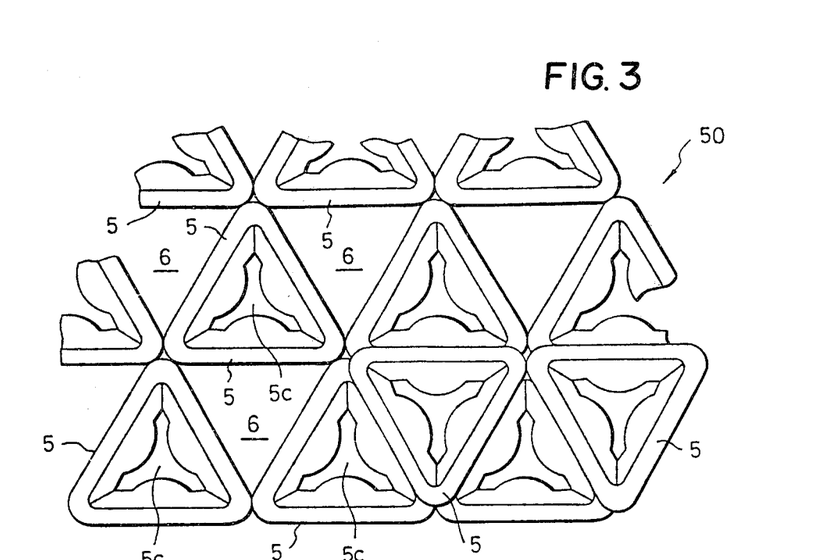
FIGS. 3 and 4 are views for explaining assembling of multitudes of packing elements shown in FIG. 2.
Figure 4:
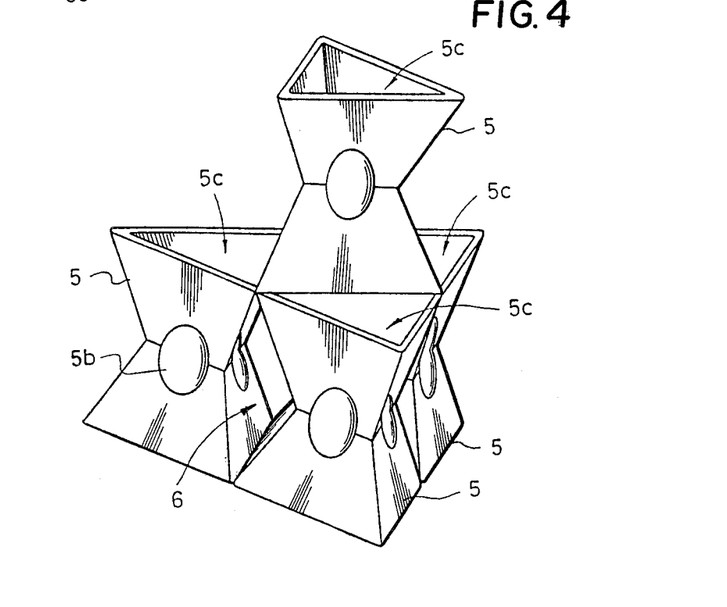

Multitudes of such hollow prism-shaped elements 5 are arranged in a honeycomb configuration as shown in FIG. 3. A hollow prism-shaped element 5 of a next layer is aligned on space 6 defined by three adjacent prism-shaped elements 5 as shown in FIGS. 3 and 4. Multitudes of prism-shaped elements 5 are arranged in many layers in the above described manner. Thus, a fluid contacting device 50 is assembled by regularly arranging the prism-shaped elements 5 in predetermined size and layers. A plurality of the fluid contacting devices 50 are provided in a predetermined number of layers in the column with the opening 5c of each constituent prism-shaped element 5 being vertically directed.

If this fluid contacting device 50 is used as a packing element, liquid flows uniformly over the inner and outer surfaces of each hollow prism-shaped element 5 and liquid and gas currents contact and react with each other in a constricted section in each prism-shaped packing element 5 and also in a constricted section defined by adjacent elements 5 while convection of the reacted liquid and gas currents takes place in widened section in each element 5 and also in a widened section defined by adjacent elements 5. Thus, the liquid and gas can be caused to react with each other most efficiently.

Figure 5:
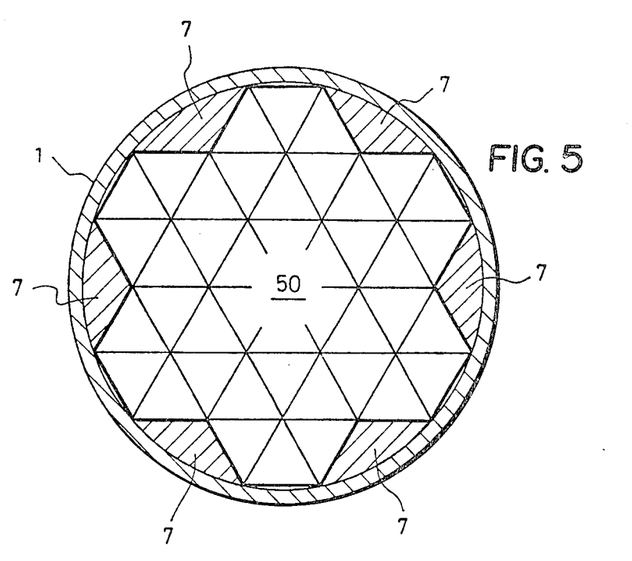
FIG. 5 is a view for showing the packed column in which the fluid contacting device made of the packing elements shown in FIG. 2 is provided.

The above described fluid contacting device 50, however, requires much labor for precisely assembling and arranging multitudes of hollow prism-shaped elements 5, bonding adjacent elements 5 together and heating them for increasing the bonding effect, etc. Further, in installing the fluid contacting device 50 in the column, an unused portion 7 (the shaded portion) as shown in FIG. 5 is inevitably formed between the column 1 and the fluid contacting device 50 due to the configuration of the device 50. Accordingly, other type of column inserts must be packed in this unused portion 7 and this brings about dropping in the contact and reaction efficiency. Furthermore, if the hollow prism-shaped element 5 is made of metal, it requires much labor due to the complicated configuration of the prism-shaped element 5 and resulting in rise of the cost of manufacture.

It is an object of the present invention to eliminate the above described disadvantages of the prior art devices. According to the invention, there is provided a method for manufacturing a fluid contacting device according to which a single side wall of vertically continuous hollow prism-shaped elements is formed of a single sheet of metal or like material and a plurality of such sheets are regularly arranged and joined together to form the fluid contacting device.

A preferred embodiment of the invention will now be described with reference to the accompanying drawings.

Figure 6:
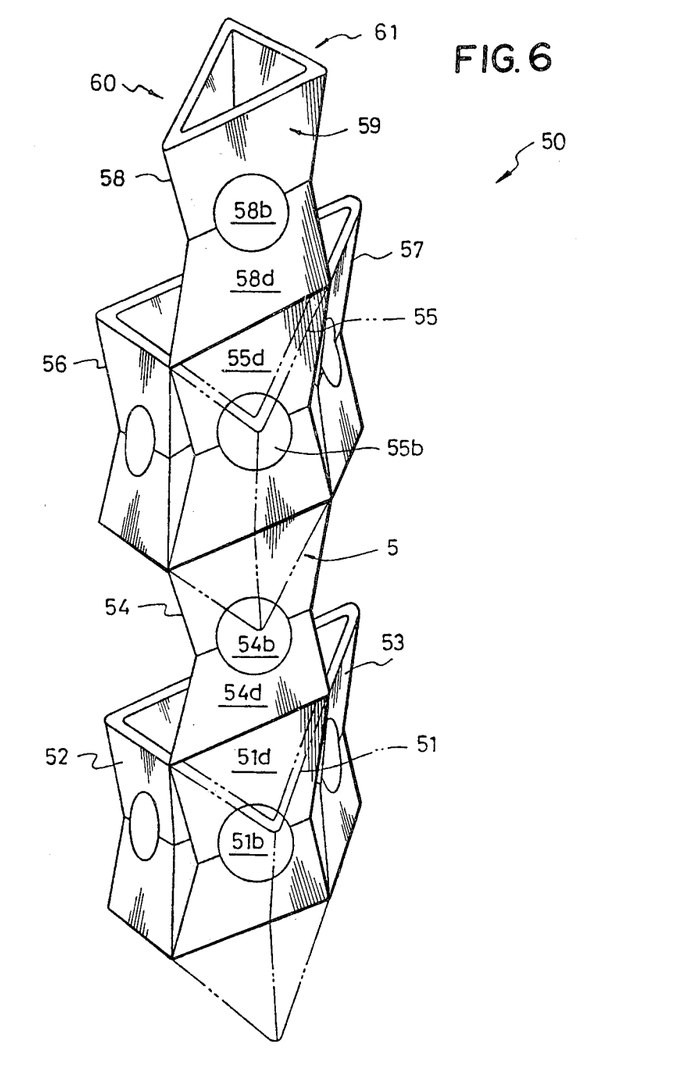
FIG. 6 is a view for explaining the state of the side wall of the respective packing elements of the fluid contacting device.

Assume now that the hollow prism-shaped elements 5 (FIG. 2) are assembled as shown in FIGS. 3 and 4 into a four-stage fluid contact device 50 shown in FIG. 6. The three prism-shaped elements in the first and third stages of the device 50 are designated by reference numerals 51–53 and the single prism-shaped element in the second and fourth stages are designated by reference numerals 54 and 58. In this assemblage, side walls 51d, 54d, 55d and 58d of the prism-shaped elements 51, 54, 55 and 58 of the first through fourth stages constitute a vertically continuous single side walls 59. Likewise, side walls of the prism-shaped elements 52, 54, 56 and 58 and the prism-shaped elements 53, 54, 57 and 58 respectively constitute vertically continuous single side walls 60 and 61.

Figure 7:
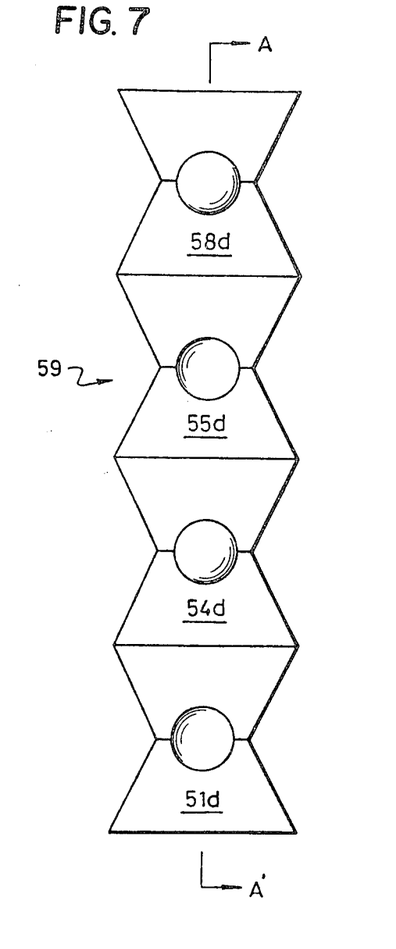
FIG. 7 is a plan view of the side wall 59 shown in FIG. 6.
Figure 8:
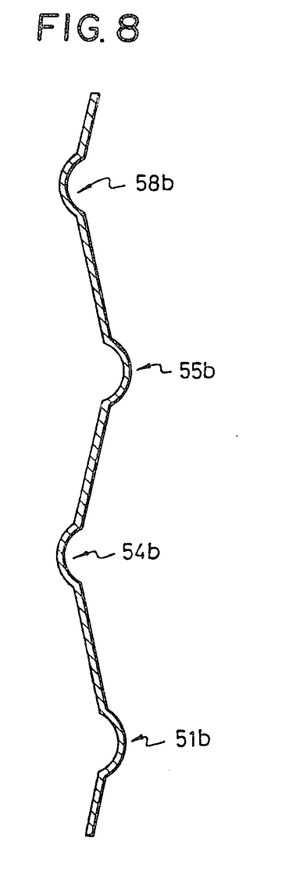
FIG. 8 is a sectional view taken along line A-A' of FIG. 7.

A plan view of the side wall 59 is shown as FIG. 7 and its sectional view as FIG. 8. The shape of the other two side walls 60 and 61 are the same as that of the side wall 59. In other words, the fluid contacting device 50 can be divided into a plurality of vertically continuous side walls such as the side walls 59–61. This means that the fluid contacting device 50 can be formed by a plurality of sheet-like members such as the side wall 59. The present invention has been made on this basic principle.

Figure 9:
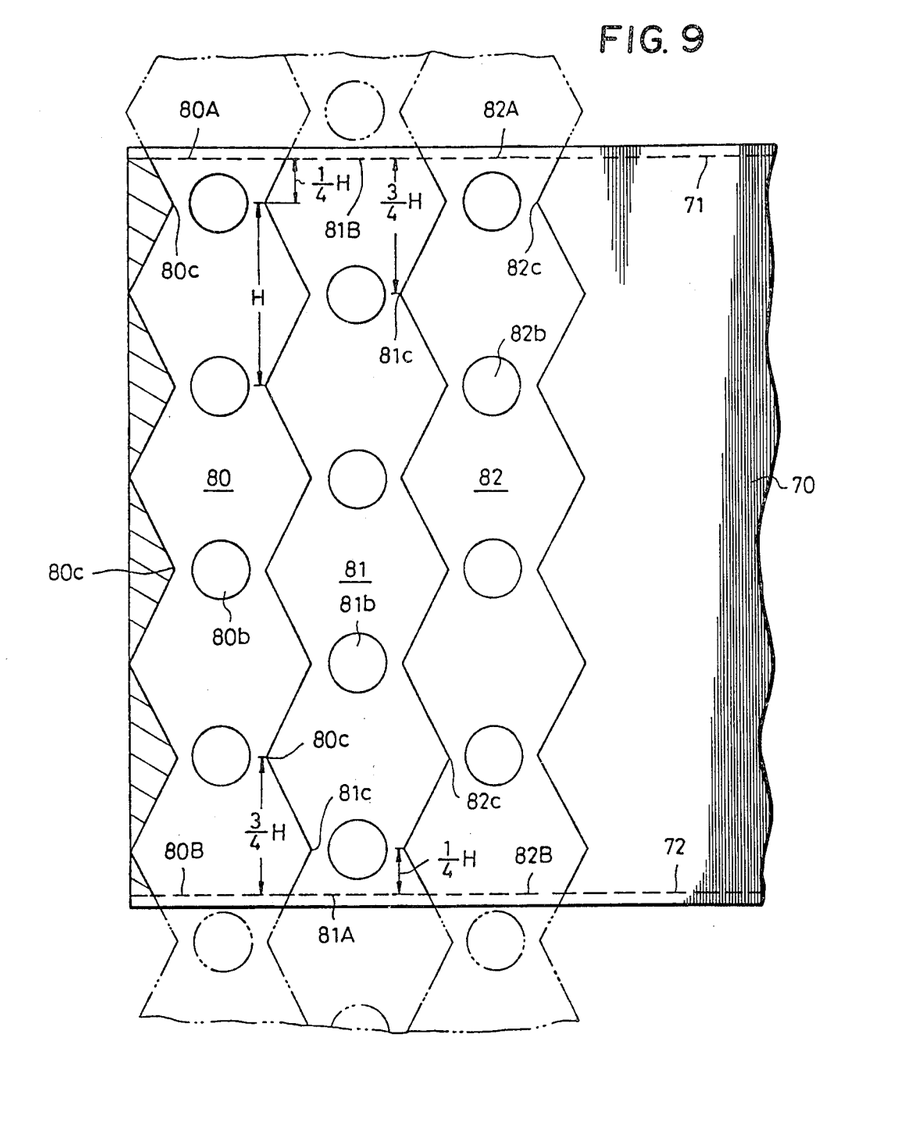
FIG. 9 is a view for showing an example of a side wall sheet used for the manufacturing method of the invention on which the contour of the side walls is plotted according to the plan view of FIG. 7.
Figure 10:
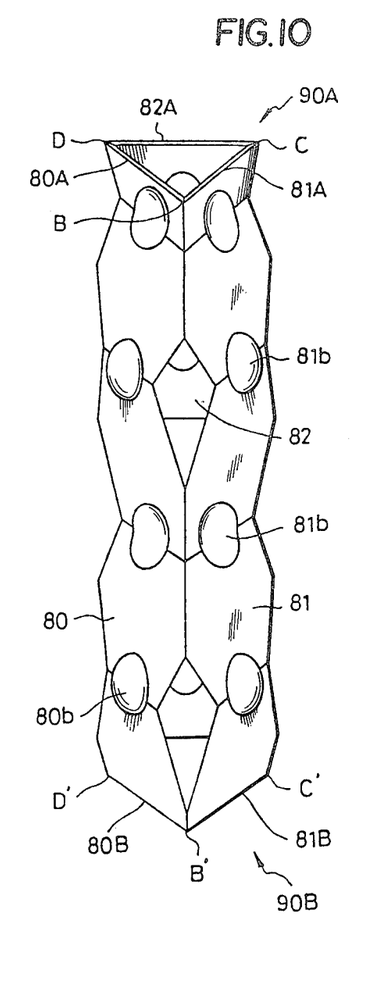
FIG. 10 is a perspective view showing a minimum unit of the fluid contacting device composed of the side wall sheet shown in FIG. 9.

Referring to FIG. 9, contours of side wall sheets 80, 81, 82, . . . as shown in FIG. 7 are plotted on an anti-corrosive stainless steel sheet 70. In this case, waste of material can be avoided by shifting respective adjacent side wall sheets 80, 81, 82 . . . by half pitch as shown in the figure. Cut lines of end portions of the side wall sheets 80A, 81A, 82A and 80B, 81B and 82B are set at distance ¼ H and ¾ H respectively from the narrowest portions 80c, 81c and 82c nearest to the ends of each side wall and the end portion of the sheet 70 is cut off along broken lines 71 and 72. Reference character H represents distance between adjacent narrowest portions 80c and 80e of the side wall sheet 80. By cutting the sheet 70 along the lines 71 and 72, the opposite ends 80A, 80B–82A, 82B, . . . of the respective side wall sheets 80–82, . . . become of the same length.

The side wall sheet 80 then is folded by pressing in an opposite direction alternately as shown in FIG. 7 and a central portion of the narrowest portion 80c is bulged on a predetermined side as shown in FIG. 8. The same process is carried out also with respect to the side wall sheets 81 and 82. Thus, a number of side wall sheets are formed by pressing.

The side wall sheets 80–82 are assembled into a hollow triangular column 90 with each of the side wall sheets 80–82 being used as a side wall and with the end portions 80A, 81A and 82A and also the end portions 80B, 81B and 82B being horizontally aligned. Then the two adjacent side wall sheets are welded together at corners B–D and B′–D′ of the two end portions. This hollow triangular column 90 constitutes a minimum unit of the fluid contacting device 50.

Figure 12:
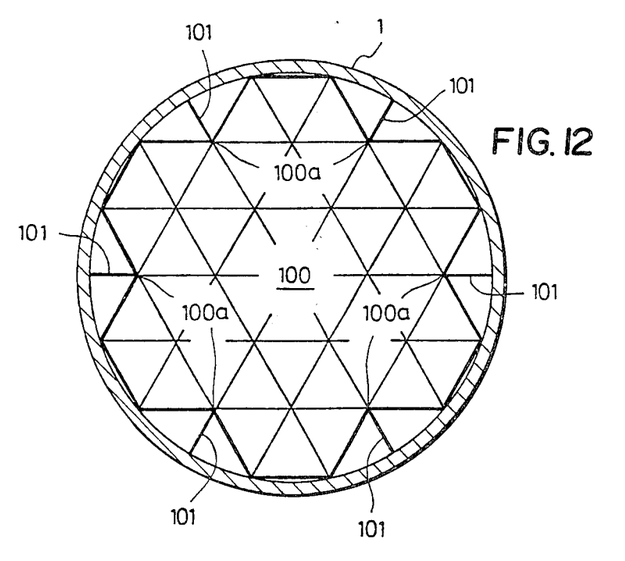
FIG. 12 is a view for explaining arrangement of the fluid contacting device formed of the side wall sheets shown in FIG. 9.

In the foregoing manner, a certain number of side wall sheets are assembled regularly into a large fluid contacting device 100 as shown in FIG. 12. The fluid contacting device thus formed is substantially of the same shape as the prior art fluid contacting device 50 composed of the hollow prism-shaped elements 5.

Figure 11:
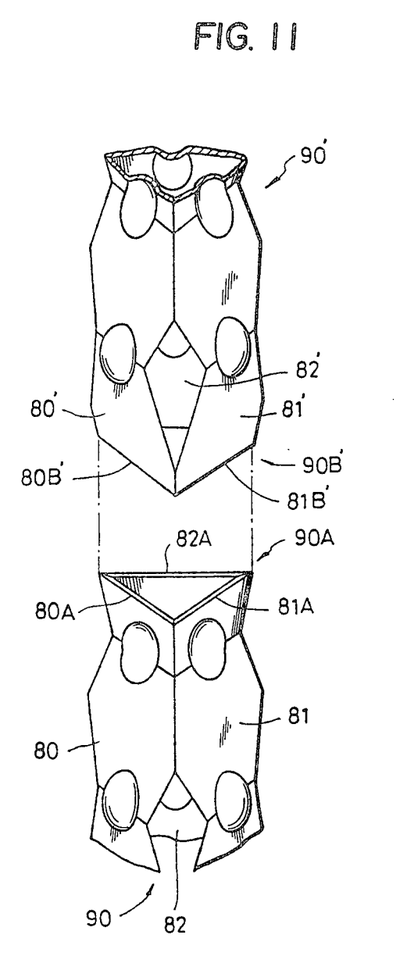
FIG. 11 is a view for explaining a case wherein a plurality of the fluid contacting devices shown in FIG. 10 are superposed in multiple stages.

In the fluid contacting device 90, respective edges 80A–82A and 80B–82B of the upper and lower end portions 90A and 90B are respectively of the same length and these edges are cut along in the relation shown in FIG. 9. Accordingly, if the lower end portion 90B of the fluid contacting device 90′ (FIG. 11) which is of the same configuration as the fluid contacting device 90 is placed on the upper end portion 90A of the fluid contacting device 90, the side walls 80, 81′; 81, 81′; 82, 82′ of the fluid contacting devices 90–90′ respectively constitute a single vertically continuous side wall. Thus, a greater fluid contacting device can be readily formed by superposing one fluid contacting device upon another in a large number of stages without changing the shape of the fluid contacting device.

By securing a side wall sheet 101 of a suitable width as shown in FIG. 12 to a corner 100a of the fluid contacting device 100, the unused portion 7 defined between the column 1 and the fluid contacting device 50 can be eliminated so that an improved fluid contact effect can be obtained.

In the above described embodiment, a stainless steel sheet is used for the side wall sheet. The material of the side wall sheet, however, is not limited to this but other metal sheets, coated metal sheets, plastic or glass fiber panels, catalytic material, members coated with catalytic material or the like may be used.

Furthermore, in the above-described embodiment, a circular bulge is formed in the narrowest portion of each side wall sheet. The shape of the bulge is not limited to this but other shapes may also be employed.

According to the present invention, assembling of the fluid contacting device is made very simple because it only requires joining of the side wall sheets one by one. Besides, waste of material in forming the side wall sheet can be held to the minimum. Furthermore, by providing a side wall sheet of a suitable width at a corner of the fluid contacting device, an unused portion between the column and the fluid contacting device can be eliminated whereby a fluid contacting efficiency can be improved.

What is claimed is:

1. A method of manufacturing a fluid contacting device comprising the steps of forming a plurality of elongated sheets each of a predetermined length, each elongated sheet having opposite longitudinal undulating edges defining alternating widened portions and constricted portions, longitudinally foreshortening said sheets to lessen said predetermined length by bending each sheet at transverse lines of juncture traversing the widest and narrowest transverse areas of said widened and constricted portions respectively, and arranging at least three of said sheets into a generally hollow column of triangular cross-section with adjacent longitudinal edges of the elongated sheets being contiguous with each other and with the transverse lines of junction being generally aligned.

2. The method as defined in claim 1 including the step of joining said adjacent longitudinal edges whereby the fluid contacting device is of a longitudinally hollow configuration.

3. The method as defined in claim 1 wherein the arranging step is performed by positioning the widened portions in adjacent alignment and the constricted portions in adjacent alignment.

4. The method as defined in claim 1 wherein each elongated sheet includes a plurality of fold lines at the transverse lines of juncture, and the bending step is performed by folding each elongated sheet in alternating opposite directions along its associated fold lines thereby reducing the predetermined length of each sheet.

5. The method as defined in claim 1 including the step of joining said adjacent longitudinal edges whereby the fluid contacting the device is of a longitudinally hollow configuration, and the arranging step is performed by positioning the widened portions in adjacent alignment and the constricted portions in adjacent alignment.

6. The method as defined in claim 1 wherein the arranging step is performed by positioning the widened portions in adjacent alignment and the constricted portions in adjacent alignment, each elongated sheet includes a plurality of fold lines at the transverse lines of juncture, and the bending step is performed by folding each elongated sheet in alternating opposite directions along its associated fold lines thereby reducing the predetermined length of each sheet.

7. The method as defined in claim 1 including the step of positioning the hollow column and other like constructed hollow columns in relative side-by-side relationship with the axes thereof generally parallel.

8. The method as defined in claim 1 including the step of positioning the hollow column and another like constructed hollow column in axially aligned relationship.

9. The method as defined in claim 1 including the step of positioning the hollow column and another like constructed hollow column in axially aligned, relatively rotated relationship.

10. The method as defined in claim 5 wherein each elongated sheet includes a plurality of fold lines at the transverse lines of juncture, and the bending step is performed by folding each elongated sheet in alternating opposite directions along its associated fold lines thereby reducing the predetermined length of each sheet.

11. The method as defined in claim 5 including the step of positioning the hollow column and other like constructed hollow columns in relative side-by-side relationship with the axes thereof generally parallel.

12. The method as defined in claim 5 including the step of positioning the hollow column and another like constructed hollow column in axially aligned relationship.

13. The method as defined in claim 5 including the step of positioning the hollow column and another like constructed hollow column in axially aligned, relatively rotated relationship.

14. The method as defined in claim 10 including the step of positioning the hollow column and other like constructed hollow columns in relative side-by-side relationship with the axes thereof generally parallel.

15. The method as defined in claim 10 including the step of positioning the hollow column and another like constructed hollow column in axially aligned relationship.

16. The method as defined in claim 10 including the step of positioning the hollow column and another like constructed hollow column in axially aligned, relatively rotated relationship.

* * * * *